US012732831B2

(12) United States Patent
Wang et al.

(10) Patent No.: US 12,732,831 B2
(45) Date of Patent: Sep. 8, 2026

(54) AI TASK CONTROL METHOD, TERMINAL, BASE STATION, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Yingying Wang, Beijing (CN); Junshuai Sun, Beijing (CN); Xin Sun, Beijing (CN); Na Li, Beijing (CN); Yun Zhao, Beijing (CN); Guangyi Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 311 days.

(21) Appl. No.: 18/576,740

(22) PCT Filed: Jul. 5, 2022

(86) PCT No.: PCT/CN2022/103824
§ 371 (c)(1),
(2) Date: Jan. 4, 2024

(87) PCT Pub. No.: WO2023/280143
PCT Pub. Date: Jan. 12, 2023

(65) Prior Publication Data
US 2024/0292237 A1 Aug. 29, 2024

(30) Foreign Application Priority Data
Jul. 5, 2021 (CN) ........................ 202110756873.5

(51) Int. Cl.
*H04W 24/02* (2009.01)
*H04W 56/00* (2009.01)
(Continued)

(52) U.S. Cl.
CPC ....... *H04W 24/02* (2013.01); *H04W 56/0015* (2013.01); *H04W 76/20* (2018.02); *H04W 80/02* (2013.01)

(58) Field of Classification Search
CPC . H04W 24/02; H04W 56/0015; H04W 76/20; H04W 80/02; H04W 40/00;
(Continued)

(56) References Cited

U.S. PATENT DOCUMENTS

| | | | |
|---|---|---|---|
| 10,992,331 | B2 | 4/2021 | Jassal |
| 2020/0104777 | A1 | 4/2020 | Bouhini |

(Continued)

FOREIGN PATENT DOCUMENTS

| | | | |
|---|---|---|---|
| CN | 1266593 | A | 9/2000 |
| CN | 112136334 | A | 12/2020 |

(Continued)

OTHER PUBLICATIONS

Supplementary European Search Report in the European application No. 22836894.0, mailed on Jun. 11, 2025. 9 pages.

(Continued)

*Primary Examiner* — Mohamed A Kamara
(74) *Attorney, Agent, or Firm* — Syncoda LLC; Feng Ma

(57) ABSTRACT

An artificial intelligence (AI) task control method, a terminal, a base station, and a storage medium are provided. The base station includes: a first functional module configured to perform at least one of the following functions by interacting
(Continued)

with the terminal: AI task control, AI task execution, network decision generation, and data management for the terminal.

14 Claims, 10 Drawing Sheets

(51) Int. Cl.
*H04W 76/20* (2018.01)
*H04W 80/02* (2009.01)

(58) Field of Classification Search
CPC . H04W 88/08; H04W 24/06; H04W 28/0205; H04W 28/09; H04W 72/04; H04W 72/50; H04W 72/54; H04W 28/02; H04L 41/16; H04L 47/125; H04L 47/127; G06N 20/00
See application file for complete search history.

(56) References Cited

U.S. PATENT DOCUMENTS

| | | | | |
|---|---|---|---|---|
| 2020/0366326 | A1 | 11/2020 | Jassal | |
| 2020/0382968 | A1* | 12/2020 | Gupta | H04L 41/145 |
| 2021/0126737 | A1 | 4/2021 | Zhang | |
| 2022/0261661 | A1* | 8/2022 | Khaligh | G06Q 10/0631 |
| 2023/0179490 | A1* | 6/2023 | Huangfu | H04W 24/02 370/252 |
| 2023/0397172 | A1* | 12/2023 | Li | G06N 3/063 |

FOREIGN PATENT DOCUMENTS

| | | | |
|---|---|---|---|
| CN | 112383927 | A | 2/2021 |
| CN | 112714486 | A | 4/2021 |
| CN | 114697984 | A | 7/2022 |
| WO | 2016072893 | A1 | 5/2016 |
| WO | 2021109499 | A1 | 6/2021 |
| WO | 2021142637 | A1 | 7/2021 |

OTHER PUBLICATIONS

OPPO et al. “SID Proposal: Study on AI/ML Model Transfer in 5GS”, 3GPP TSG-SA WG1 Meeting #88 S1-193479, Nov. 22, 2019 (Nov. 22, 2019), entire document. 3 pages.

International Search Report in the international application No. PCT/CN2022/103824, mailed on Oct. 10, 2022. 5 pages with English translation.

Written Opinion of the International Search Authority in the international application No. PCT/CN2022/103824, mailed on Oct. 10, 2022. 10 pages with English translation.

* cited by examiner

AI TASK CONTROL METHOD, TERMINAL, BASE STATION, AND STORAGE MEDIUM

CROSS-REFERENCE TO RELATED APPLICATIONS

This application is a U.S. National Stage of International Application No. PCT/CN2022/103824 filed on Jul. 5, 2022, which claims priority to Chinese Patent application No. 202110756873.5 filed on Jul. 5, 2021. The disclosures of the above-referenced applications are hereby incorporated by reference in their entirety.

TECHNICAL FIELD

The disclosure relates to the technical field of mobile communication, and in particular to an Artificial Intelligence (AI) task control method, a terminal, a base station, and a storage medium.

BACKGROUND

Fifth-generation mobile communication technology (5G) and AI are gradually integrating into people's lives, and bring new economic growth trends. With the rapid development of AI technologies, in a future network, the network architecture will be more and more integrated with the AI technologies. In a future sixth-generation mobile communication technology (6G) era, AI will inevitably become an essential part of the network architecture.

In the related art, combination of the network architecture and AI is still in an initial stage of research, and many application scenarios have not been considered in the network architecture. For example, AI enhancement usually uses plug-in solutions, and an intelligent endogenous network architecture has not been proposed. For another example, although a terminal has certain computing power, AI capability of the terminal side is not considered when the network is designed. Furthermore, in the related art, AI model is trained at the network side, a part of data of the network or terminal is usually acquired through the network, AI modeling is performed through the data, and the design is optimized according to goals to be achieved. However, the above solutions face some challenges: 1) More and more volumes of data need to be reported, which furthermore occupies more network bandwidth. 2) The terminal also becomes more and more intelligent, however, this architecture may only perform AI calculation at the network side, and does not fully utilize computing power of the terminal. 3) In a communication network, the terminal usually obtains data with more dimensions than the network side, however, security of data of the terminal is a sensitive factor.

SUMMARY

In order to solve problems of the related art, at least one embodiment of the disclosure provides an AI task control method, a terminal, a base station, and a storage medium.

According to an aspect of the disclosure, at least one embodiment provides a base station, the base station includes a first function module.

The first function module is configured to perform at least one of AI task control for a terminal, AI task execution, network decision generation, or data management by interacting with the terminal.

According to another aspect of the disclosure, at least one embodiment provides a terminal, the terminal includes a second function module.

The second function module is configured to perform at least one of following functions through interacting with a base station: AI task control to the terminal, data acquisition and report, or AI task execution.

According to another aspect of the disclosure, at least one embodiment provides an AI task control method, the method is applied to a base station, and includes the following operations.

A first function module of the base station performs at least one of AI task control for a terminal, AI task execution, network decision generation, or data management by interacting with the terminal.

According to another aspect of the disclosure, at least one embodiment provides an AI task control method, the method is applied to a terminal, and includes the following operations.

A second function module of the terminal performs at least one of following functions through interacting with a base station: AI task control to the terminal, data acquisition and report, or AI task execution.

According to another aspect of the disclosure, at least one embodiment provides a base station, the base station includes a processor, a memory, and a program stored on the memory and executable on the processor, the program implements operations of any method at the base station side when the program is executed by the processor.

According to another aspect of the disclosure, at least one embodiment provides a terminal, the terminal includes a processor, a memory, and a program stored on the memory and executable on the processor, the program implements operations of any method at the terminal side when the program is executed by the processor.

According to another aspect of the disclosure, at least one embodiment provides a computer-readable storage medium, having stored thereon a computer program, the computer program implements operations of any method at the base station side or the terminal side when the computer program is executed by a processor.

Compared to the related art, according to the AI task control method, the terminal, the base station and the storage medium provided in embodiments of the disclosure, an intelligent endogenous network architecture and corresponding AI interaction processes are provided. Here, based on fully mining computing power of the terminal, that is, based on utilizing the computing power of the terminal, intelligence is used as a part of air interface transmission, to implement an intelligent endogenous network and improve intelligence of the network. In the embodiments of the disclosure, the terminal acquires data, preprocesses the data and then reports to the base station, which may reduce volumes of data required to be uploaded. Furthermore, since the uploaded data is not original user data, security of data of the terminal may be improved.

BRIEF DESCRIPTION OF THE DRAWINGS

Various other advantages and benefits will become apparent to those of ordinary skill in the art upon reading following detailed descriptions of some embodiments. The drawings are only for the purpose of illustrating some embodiments, and are not considered as limitation to the disclosure. Furthermore, the same reference numeral is used to denote the same component throughout the drawings. In the drawings:

FIG. 7 is a flowchart when an AI task control method according to an embodiment of the disclosure is applied to a base station side.

FIG. 8 is a flowchart when an AI task control method according to an embodiment of the disclosure is applied to a terminal side.

DETAILED DESCRIPTION

Figure 1:
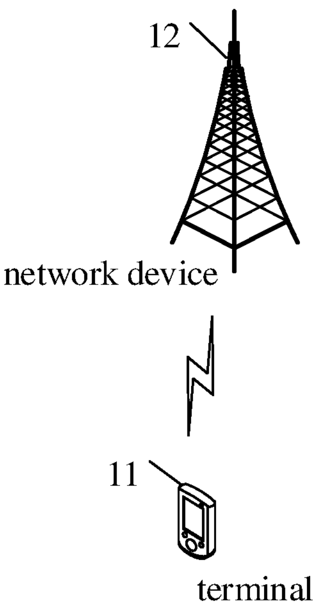
FIG. 1 is a schematic diagram of an application scenario according to an embodiment of the disclosure.

Exemplary embodiments of the disclosure will be described in more detail below with reference to the drawings. Although the exemplary embodiments of the disclosure are shown in the drawings, it should be understood that the disclosure may be implemented in various forms and should not be limited to the embodiments set forth here. Instead, these embodiments are provided so that the disclosure may be understood more thoroughly, and the scope of the disclosure may be fully conveyed to those skilled in the art.

Terms "first", "second" or the like in the description and claims of the disclosure are intended to distinguish similar objects, and are not necessarily intended to describe a specific order or sequence. It should be understood that data used as such are interchangeable in appropriate cases, such that for example, the embodiments of the disclosure described here may be implemented in sequences besides those shown or described here. Furthermore, terms "include", "have" as well as any variants thereof, are intended to cover a non-exclusive inclusion. For example, a process, method, system, product or device including a sequence of operations or units is not necessarily limited to those operations or units listed clearly, instead, may include other operations or units which not listed clearly or inherent to the process, method, product or device. In the description and claims, "and/or" indicates at least one of connected objects.

Technologies described in the disclosure are not limited to a New Radio (NR) system and a Long Time Evolution (LTE)/LTE-Advanced (LTE-A) system, and may also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. Terms "system" and "network" are often used interchangeably. The CDMA system may implement radio technologies such as CDMA2000, Universal Terrestrial Radio Access (UTRA), etc. UTRA includes Wideband Code Division Multiple Access (WCDMA) and other CDMA variants. The TDMA system may implement radio technologies such as Global System for Mobile Communication (GSM), etc. The OFDMA system may implement radio technologies such as Ultra Mobile Broadband (UMB), Evolution-UTRA (E-UTRA), IEEE 802.21 (Wi-Fi), IEEE 802.16 (WiMAX), IEEE 802.20, Flash-OFDM, etc. UTRA and E-UTRA are part of Universal Mobile Telecommunications System (UMTS). LTE and more advanced LTE (such as LTE-A) are new UMTS versions using E-UTRA. UTRA, E-UTRA, UMTS, LTE, LTE-A and GSM are described in documents from an organization named "3rd Generation Partnership Project (3GPP)". CDMA2000 and UMB are described in documents from an organization named "3rd Generation Partnership Project 2 (3GPP2)". Technologies described in the disclosure may be used in the systems and radio technologies mentioned above, and may also be used in other systems and radio technologies. However, the following descriptions describe the NR system for the purpose of examples, and NR terms are used in most of the following descriptions, although these technologies are also applicable to applications besides applications of the NR system.

The following descriptions provide examples, rather than limiting the scope, applicability or configuration set forth in the claims. Variations may be made to functions and arrangements of discussed elements, without departing from the spirit and scope of the disclosure. Various examples may omit, replace, or add various procedures or components appropriately. For example, the described methods may be performed in an order different from that described, and various operations may be added, omitted or combined. Furthermore, features described with reference to certain examples may be combined in other examples.

FIG. 1 shows a block diagram of a wireless communication system to which the embodiments of the disclosure are applicable. The wireless communication system includes a terminal 11 and a network device 12. The terminal 11 may also be referred to as a user terminal or User Equipment (UE), or may also be referred to as a user, and the terminal 11 may include terminal-side devices such as a mobile phone, a tablet personal computer, a laptop computer, a Personal Digital Assistant (PDA), a Mobile Internet Device (MID), a wearable device, or a vehicle-mounted device, etc. It should be noted that specific type of the terminal 11 is not limited in the embodiments of the disclosure. The network device 12 may include elements of a core network and/or a base station. The base station may include a base station of 5G and later versions (such as gNB, 5G NR NB, etc.) or a base station in other communication systems (such as eNB, WLAN access point, or other access point, etc.). The base station may be referred to as Node B (NB), evolved Node B (eNB), access point, Base Transceiver Station (BTS), radio base station, radio transceiver, Basic Service Set (BSS), Extended Service Set (ESS), B node, evolved B node, home B node, home evolved B node, WLAN access point, Wi-Fi node, or any other suitable terms in the field, as long as the same technical effect is achieved, the base station is not limited to specific technical terms. It should be noted that the base station in the NR system is taken as an example only in the embodiments of the disclosure, however, specific type of the base station is not limited.

The base station may communicate with the terminal 11. Some base stations may communicate control information or user data with the core network through backhaul. In some examples, some of these base stations may communicate with each other directly or indirectly through a backhaul link which may be a wired or wireless communication link. The wireless communication system may support operations on multiple carriers (waveform signals with different frequencies). A multi-carrier transmitter may transmit modulated signals on multiple carriers simultaneously. For example, each communication link may be a multi-carrier signal modulated according to various radio technologies. Each modulated signal may be sent on a different carrier and may carry control information (such as reference signal, control channel, etc.), overhead information, data, etc.

The base station may wirelessly communicate with the terminal 11 through one or more antennas of the access point. Each base station may provide communication coverage to a corresponding coverage area thereof. The coverage area of the access point may be divided into sectors each constituting only a part of the coverage area. The wireless communication system may include different types of base stations (such as macro base station, micro base station, or pico base station). The base station may also use different radio technologies, such as cellular or WLAN radio access technologies. The base station may be associated with the same or different access network or operator deployments. Coverage areas of different base stations (including coverage areas of the same or different types of base stations, coverage areas using the same or different radio technologies, or coverage areas belonging to the same or different access networks) may overlap.

The communication link in the wireless communication system may include an Uplink (UL) for carrying UL transmission (for example, from the terminal 11 to the network device 12) or an Downlink (DL) for carrying DL transmission (for example, from the network device 12 to the terminal 11). The UL transmission may also be referred to as reverse link transmission, and the DL transmission may also be referred to as forward link transmission. The DL transmission may be performed by using a licensed band, an unlicensed band, or both. Similarly, the UL transmission may be performed by using a licensed band, an unlicensed band, or both.

As mentioned in the background, the network architecture in the related art does not fully utilize computing power of the terminal, requires the terminal to upload a large volume of data, which occupies too much bandwidth and is not conducive to security of data of the terminal. In order to solve at least one of the above problems, an embodiment of the disclosure provides an AI task control method, which may implement an intelligent endogenous network and improve intelligence of the network, based on utilizing the computing power of the terminal.

Figure 2:
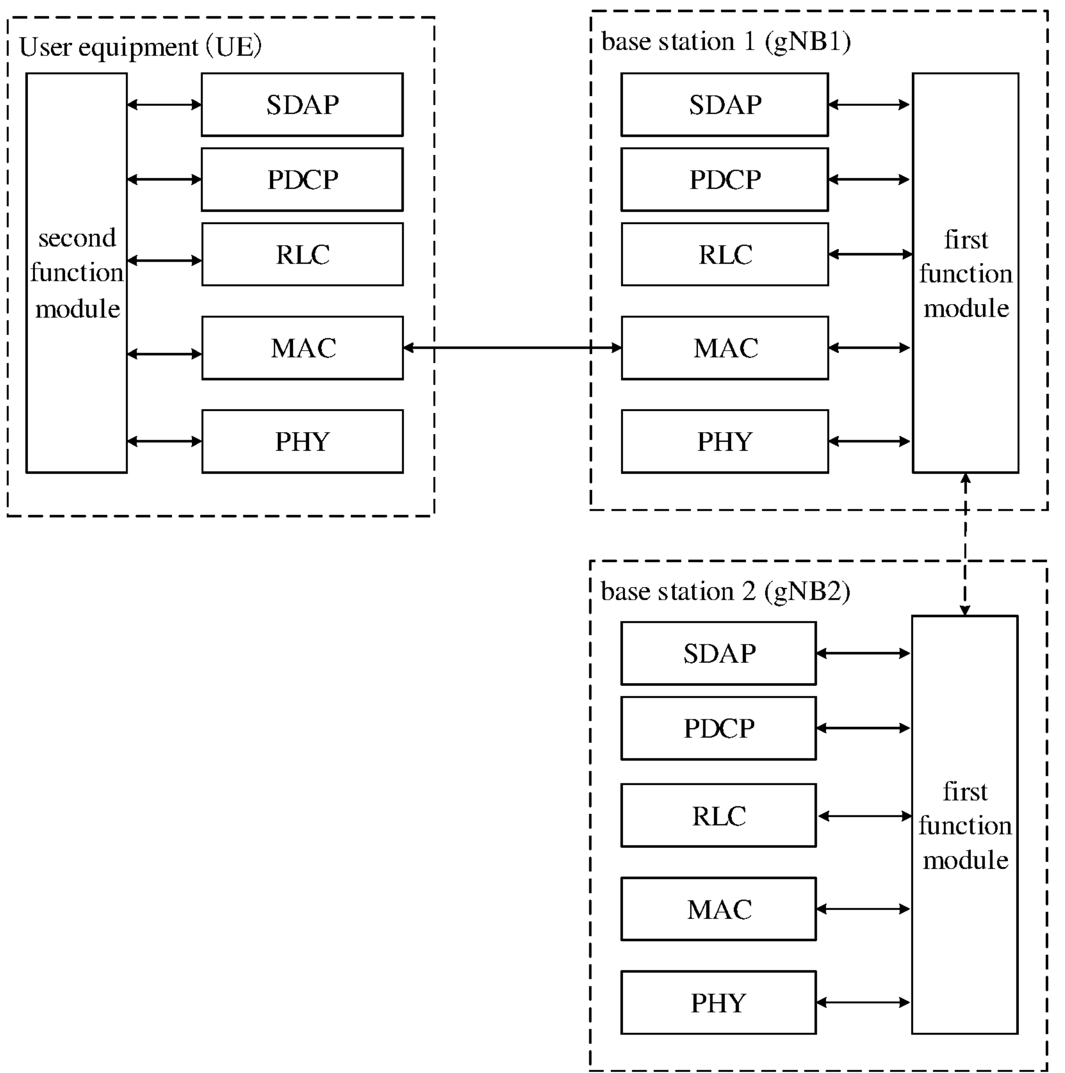
FIG. 2 is an exemplary diagram of an AI endogenous module in a user plane protocol stack according to an embodiment of the disclosure.
Figure 3:
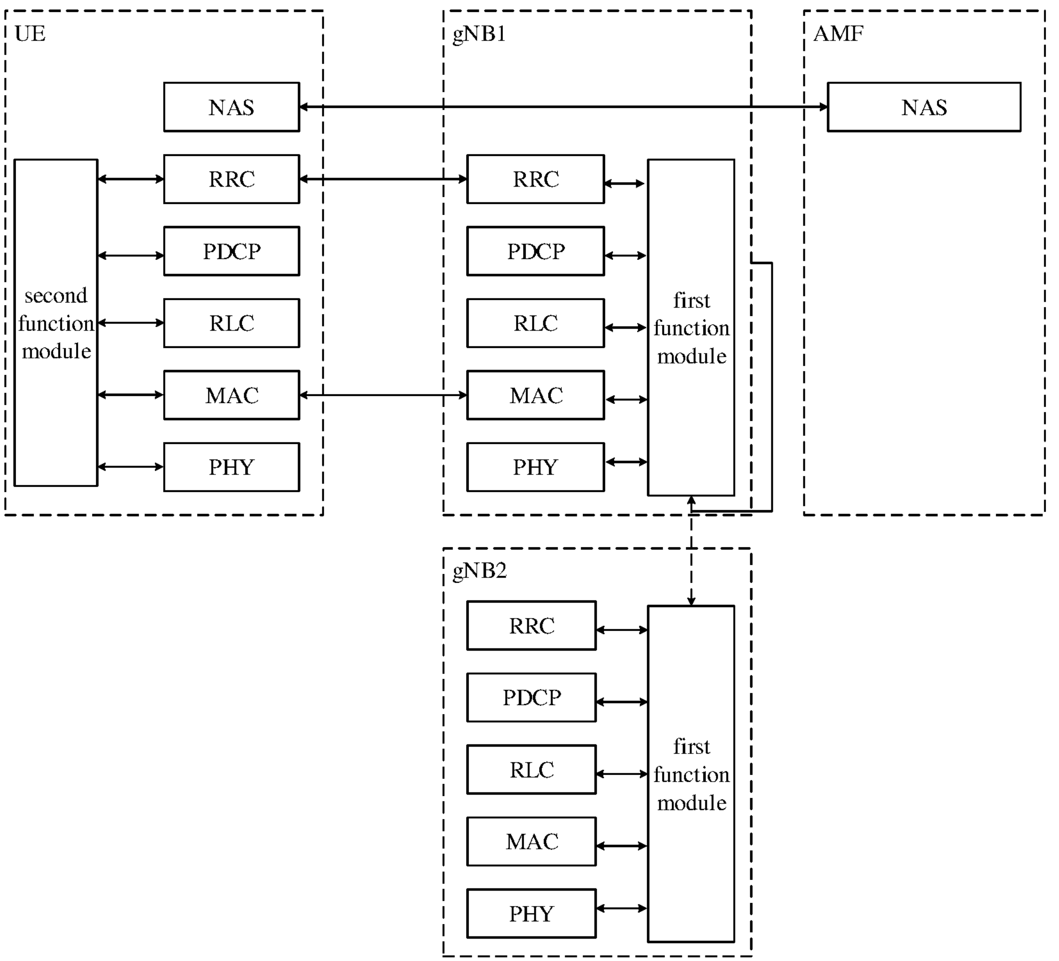
FIG. 3 is an exemplary diagram of an AI endogenous module in a signaling plane protocol stack according to an embodiment of the disclosure.

As shown in FIG. 2 and FIG. 3, in the embodiment of the disclosure, an AI endogenous module is added to the base station (including a base station 1 and a base station 2) and the terminal respectively. In order to facilitate descriptions, the AI endogenous module in the base station is referred to as a first function module, the AI endogenous module in the terminal is referred to as a second function module. Names of the first function module and the second function module are not limited in the embodiments of the disclosure, as long as functions of the first function module and the second function module are implemented. FIG. 2 gives an example of an AI endogenous module in a user plane protocol stack, and FIG. 3 gives an example of an AI endogenous module in a signaling plane protocol stack (control plane protocol stack).

The first function module in the base station is configured to perform at least one of AI task control for a terminal, AI task execution, network decision generation, or data management by interacting with the terminal.

Here, the AI task control of the base station to the terminal may be understood as end-to-end AI task control.

The second function module in the terminal is configured to perform at least one of following functions through interacting with a base station: AI task control to the terminal, data acquisition and report, or AI task execution.

In the embodiments of the disclosure, through interaction between the base station and the AI endogenous module of the terminal, the terminal acquires data, preprocesses the data and then reports to the base station, which may reduce volumes of data required to be uploaded. Furthermore, since the uploaded data is not original user data, security of data of the terminal may be improved. The embodiments of the disclosure may also utilize the computing power of the terminal to execute AI tasks and report execution results, so that existing computing power of the terminal may be fully utilized to implement an intelligent endogenous network and improve intelligence of the network.

Figure 4:
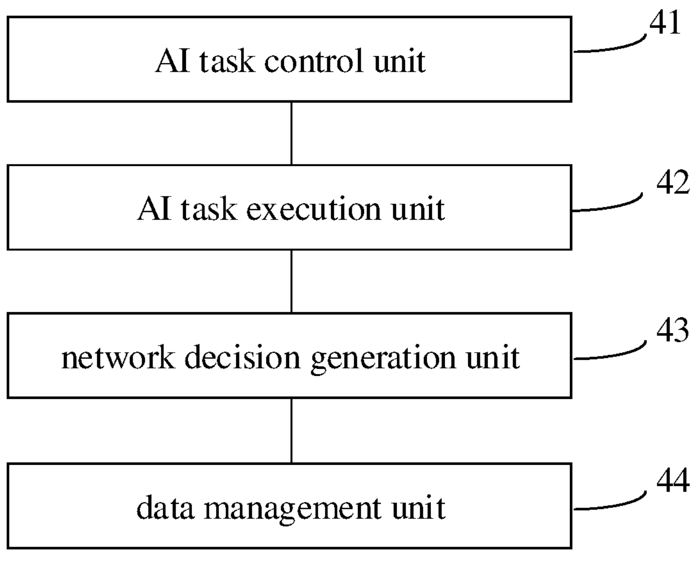
FIG. 4 is a schematic structural diagram of a first function module according to an embodiment of the disclosure.

As shown in FIG. 4, the first function module at the base station side may specifically include at least one of an AI task control unit 41, an AI task execution unit 42, a decision generation unit 43 or a data management unit 43.

The AI task control unit 41 is configured to determine one or more configurations of configurations including a first AI model and algorithm required to be used, data acquisition requirement, data preprocessing mode, AI task configuration, and AI model evaluation indexes according to external or internal task requirement of the base station, configure the one or more configurations to at least the terminal or a local position, and receive at least a data acquisition result or AI model evaluation result sent by the terminal.

The AI task execution unit 42 is configured to generate a corresponding execution result based on the data acquisition result (such as the data acquisition result sent by the terminal and received by the AI task control unit 41) according to the first AI model and algorithm.

The decision generation unit 43 is configured to generate network decision according to the execution result generated by the AI task execution unit 42.

The data management unit 44 is configured to maintain a task queue of AI tasks, an AI model and algorithm library, and an acquired data set. Maintenance of the data set may include managing data acquired by the terminal in a set manner.

In the embodiments of the disclosure, the AI task control unit 41 may determine the data acquisition requirement and the data preprocessing mode according to external requirement or optimization goal. For example, when resource allocation optimization configured externally is turned on, the first function module determines the data acquisition requirement, data preprocessing mode and data maintenance mode corresponding to the resource allocation optimization. At this time, the first function module may also configure a physical layer to acquire channel quality of a current user, configure a Service Data Adaptation Protocol (SDAP) and Packet Data Convergence Protocol (PDCP) layer to acquire data type of the user, configure a Media Access Control (MAC) layer to acquire throughput or other information of the user, and configure the data acquisition requirement and data preprocessing mode to the terminal.

In an embodiment, the AI task control unit 41 may be further configured to form an AI model library for executing the task requirement according to the task requirement, determine the AI model evaluation indexes, evaluate AI models in the AI model library, and determine the first AI model required to be used, the evaluation indexes include at least model convergence time or prediction accuracy.

In an embodiment, the AI task control unit 41 may be further configured to send the data acquisition requirement to a corresponding module in the base station, and receive the data acquisition result sent by the corresponding module in the base station. The decision generation unit 43 may be further configured to send the network decision to the corresponding module in the base station.

In an embodiment, the AI task control unit 41 may be further configured to determine other network elements required to participate in calculation of the task requirement, schedule and control the other network elements to participate in a training task of the first AI model, and perform synchronization of the first AI model and transmission of model parameters between the base station and the other network elements.

In the embodiments of the disclosure, the base station may further include a Radio Resource Control (RRC) layer function module, this module is arranged in a RRC layer of the base station shown in FIG. 2 and configured to perform at least one of following operations:

- sending a first task request to the terminal;
- receiving a second task requirement from the terminal and sending the second task requirement to the first function module;
- receiving one or more configurations, that are determined by the first function module, of configurations including the first AI model and algorithm, the data acquisition requirement, the data preprocessing mode, the AI task configuration, and the AI model evaluation indexes, and sending the one or more configurations to the terminal;
- receiving at least one of data, labels, AI model evaluation results or AI model parameters sent by the terminal or other network element nodes and sending the at least one of data, labels, AI model evaluation results or AI model parameters to the first function module; or
- receiving network decision for the second task requirement fed back by the first function module and sending the network decision for the second task requirement to the terminal.

In an embodiment, the base station may further include a MAC layer function module, this module is arranged in a MAC layer of the base station shown in FIG. 2 and configured to perform at least one of following operations:

- sending a third task requirement to the terminal;
- receiving a fourth task requirement from the terminal and sending the fourth task requirement to the first function module;
- receiving one or more configurations, that are determined by the first function module, of configurations including the first AI model and algorithm, the data acquisition requirement, the data preprocessing mode, the AI task configuration, and the AI model evaluation indexes, and sending the one or more configurations to the terminal;
- receiving at least one of data, labels, AI model evaluation results or AI model parameters sent by the terminal or other network element nodes and sending the at least one of data, labels, AI model evaluation results or AI model parameters to the first function module; or
- receiving network decision for the second task requirement fed back by the first function module and sending the network decision for the second task requirement to the terminal.

Furthermore, in an actual application, the base station may further include other protocol layer modules, the other protocol layer modules may specifically include a PDCP layer function module, a SDAP layer function module, or the like, and these function modules may be configured to perform at least one of following operations:

- issuing a fifth task requirement to the first function module; or
- receiving network decision for the fifth task requirement fed back by the first function module.

It may be seen from the above descriptions that interaction between the first function module at the base station side and other modules includes:

A) interior of a network element: according to the requirement and optimization goal, the first function module sends the network decision to the corresponding module; according to the data acquisition requirement, the first function module sends data acquisition instructions to other modules and receives corresponding data acquisition results. Here, the network element refers to the base station, and the interior of the network element refers to interior of the base station to which the first function module belongs.

b) between network elements, between network elements and terminals: in case of AI computing which requires participation of multiple network elements, the first function module is responsible for scheduling training tasks of the participants, controlling the training tasks of the participants, synchronization of the AI model, and data transmission of AI models and weights between the network elements. In case of a data acquisition requirement which requires cooperation of the terminal, the first function module further performs data acquisition configuration on the terminal, including data acquisition messages of raw data or preprocessed data. Here, 'between network elements' refers to 'between various base stations'.

At the network side, protocol layers interacting with the first function module includes one or more of RRC, MAC or other protocol layers of the base station.

1) RRC: RRC issues a corresponding task requirement (such as optimization goal or requirement) to the first function module, such as optimization of switching parameters, the first function module generates a corresponding data acquisition requirement and AI model parameters, and task configuration is sent to the terminal through RRC signaling. The first function module feeds back the decision to RRC.
2) MAC: MAC issues a task requirement (such as optimization goal or requirement) to the first function module, the first function module notifies a corresponding data acquisition requirement and/or AI model parameters to MAC, and MAC receives data and/or AI model parameters from other network element nodes or terminals and notifies the first function module; the MAC layer is responsible for interaction between the AI model and/or data acquisition and the terminal.
3) Other protocol layers of the base station: other protocol layers of the base station issue corresponding task requirements (such as optimization goal or requirement) to the first function module, the first function module generates corresponding data acquisition requirements, obtains an optimization result in combination with the data acquisition result, and feeds back the optimization result to a corresponding protocol layer.

The embodiments of the disclosure use intelligence as a part of the base station by introducing the intelligent endogenous architecture. Organic integration of AI model algorithm, interaction process and wireless communication is implemented through integration with the wireless architecture, and the purpose of self-optimization, self-evolution and self-generation of the base station is achieved.

In an actual application, the first function module, the RRC layer function module, the MAC layer function module and other protocol layer modules may be implemented by a processor in the base station in combination with a transceiver.

Figure 5:
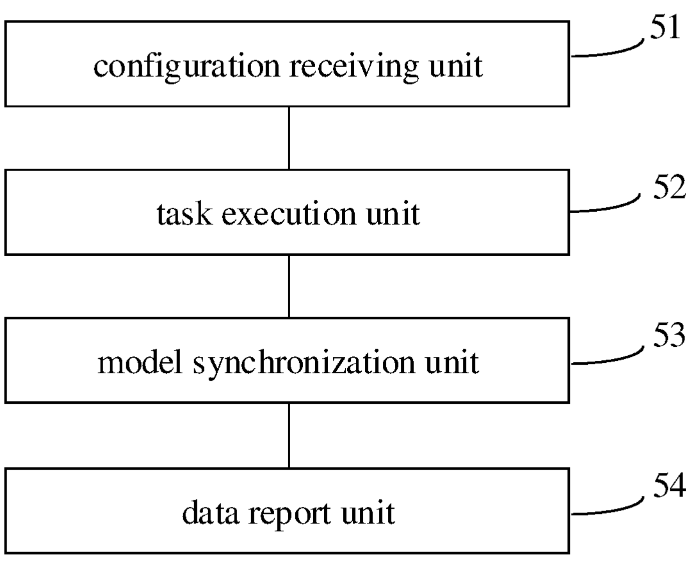
FIG. 5 is a schematic structural diagram of a second function module according to an embodiment of the disclosure.

As shown in FIG. 5, the second function module at the terminal side may specifically include at least one of a configuration receiving unit 51, a task execution unit 52, a model synchronization unit 53 or a data report unit 54.

The configuration receiving unit 51 is configured to receive one or more configurations, that are sent by the base station, of configurations including a first AI model and algorithm, data acquisition requirement, data preprocessing mode, AI task configuration, and AI model evaluation indexes.

The task execution unit 52 is configured to execute an AI task according to the first AI model and algorithm configured by the base station, and generate an inference result; perform evaluation according to the AI model evaluation indexes configured by the base station, obtain at least AI model evaluation results or AI model parameters and send at least the AI model evaluation results or AI model parameters to the base station.

The model synchronization unit 53 is configured to perform AI model synchronization between the terminal and the base station.

The data report unit 54 is configured to acquire data according to the data acquisition requirement and the data preprocessing mode, generate at least acquired data or labels, and report at least the acquired data or labels to the base station.

In the embodiments of the disclosure, the terminal may further include a RRC layer function module, this module is arranged in a RRC layer of the terminal shown in FIG. 2 and configured to perform at least one of following operations:

- receiving a first task requirement from the base station and issuing the first task requirement to the second function module;
- sending a second task requirement generated by the second function module itself to the base station through the RRC layer;
- receiving one or more configurations, that are sent by the base station, of configurations including the first AI model and algorithm, the data acquisition requirement, the data preprocessing mode, the AI task configuration, and the AI model evaluation indexes, and sending the one or more configurations to the configuration receiving unit 51; or
- sending at least one of the acquired data, labels, AI model evaluation results or AI model parameters to the base station.

In an embodiment, the terminal may further include a MAC layer function module, this module is arranged in a MAC layer of the terminal shown in FIG. 2 and configured to perform at least one of following operations:

- receiving a third task requirement from the base station and issuing the third task requirement to the second function module;
- sending a fourth task requirement generated by the second function module itself to the base station through the MAC layer;
- receiving one or more configurations, that are sent by the base station, of configurations including the first AI model and algorithm, the data acquisition requirement, the data preprocessing mode, the AI task configuration, and the AI model evaluation indexes, and sending the one or more configurations to the configuration receiving unit 51; or
- sending at least one of the acquired data, labels, AI model evaluation results or AI model parameters to the base station.

Furthermore, in an actual application, the terminal may further include other access protocol layer modules, the other access protocol layer modules may specifically include a PDCP layer function module, a Radio Link Control (RLC) layer function module, or the like, and these function modules may be configured to perform at least one of following operations:

- issuing a sixth task requirement to the second function module; or
- acquiring data according to the data acquisition requirement generated by the second function module, and feeding back to the second function module.

It may be seen from the above descriptions that at the terminal side, protocol layers interacting with the second function module include one or more of RRC, MAC or other access protocol layers.

1) RRC: a. RRC of the terminal sends a corresponding task requirement (such as optimization goal or requirement) to the second function module, or the second function module generates a corresponding task requirement, feeds back the corresponding task requirement to the first function module at the base station side through the RRC layer. b. RRC of the terminal acquires data and reports to the terminal according to the configuration. The second function module receives the data acquisition configuration carried by RRC signaling at the network side, processes the acquired data, generates the acquired data and labels according to the data acquisition requirement, and sends the acquired data and labels to the access network through RRC of the terminal. c. RRC of the terminal receives initial configuration of the AI model of the first function module at the base station side through the RRC layer.
2) MAC: MAC of the terminal receives the data acquisition requirement sent by MAC at the network side and/or AI model parameters interacted with other nodes, and notifies the second function module. The MAC layer of the terminal is responsible for interaction between the AI model at the network side, acquiring and collecting data of the terminal, and reporting through MAC data packets.
3) Other access protocol layers: acquire data according to the corresponding data acquisition requirement generated by the second function module of the terminal, and feed back to the endogenous AI module.

In an actual application, the second function module, the RRC layer function module, the MAC layer function module and other access protocol layer modules may be implemented by a processor in the terminal in combination with a transceiver.

Figure 6:
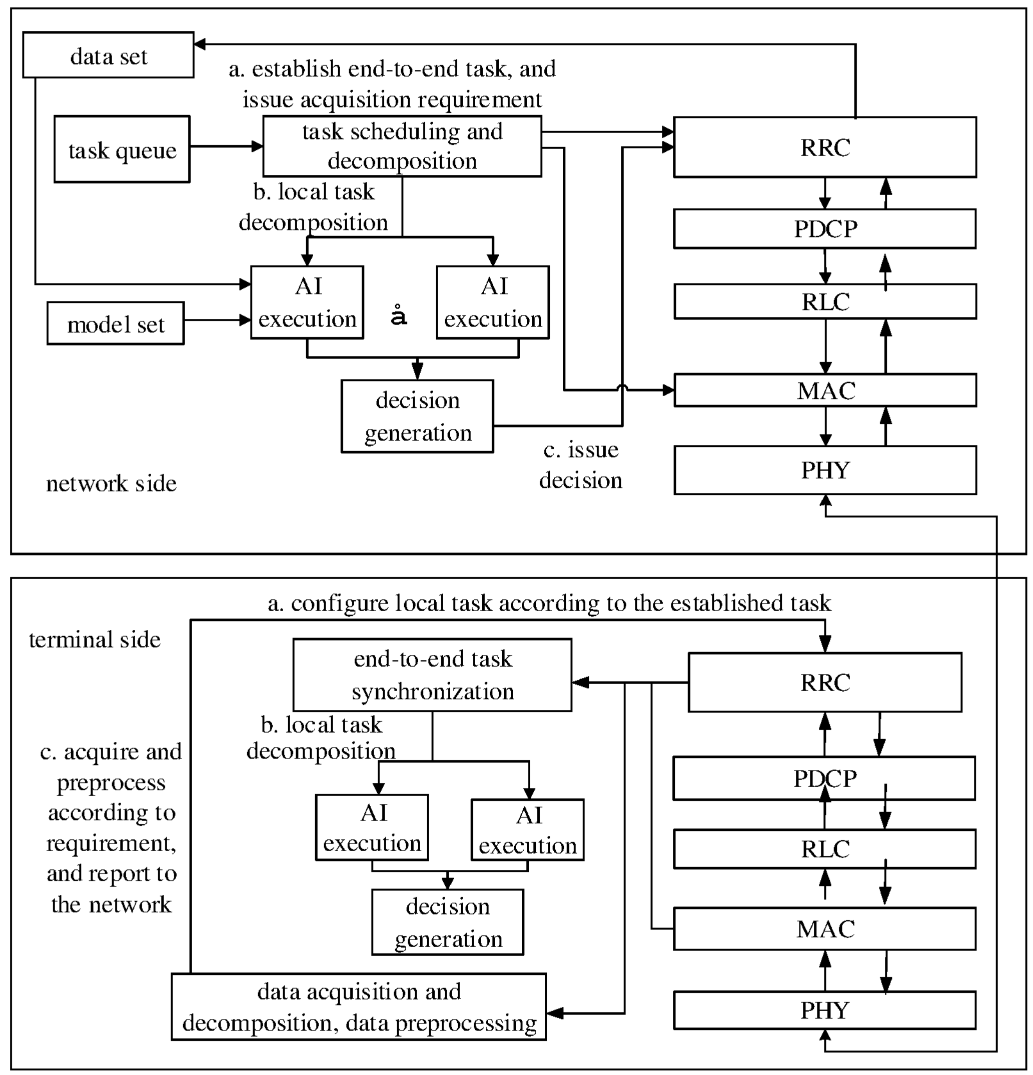
FIG. 6 is an exemplary diagram of an AI endogenous overall architecture according to an embodiment of the disclosure.

FIG. 6 shows an example of an AI endogenous overall architecture provided in an embodiment of the disclosure. In the embodiment of the disclosure, the AI task control to the terminal includes: the network, as a manager of the AI task, is responsible for functions such as AI task management of the terminal, data acquisition and data preprocessing configuration, model synchronization, etc.

The AI task management of the terminal specifically includes: determining a task currently required to be performed by the network through an external or internal optimization task, such as externally triggered load balancing or resource allocation optimization from interior of the network; selecting the corresponding model and algorithm; and configuring the corresponding model and algorithm to the local position and the terminal. The network side sends initial configuration of the AI task configuration to the terminal side, and the terminal establishes an AI task after receiving the configuration information, and decomposes a local task to one or more AI training and inference executors for calculation. The initial configuration and reconfiguration of the AI task, selection of the AI model and algorithm, data acquisition and preprocessing configuration may be sent to the terminal through RRC signaling or MAC Control Element (CE).

Data acquisition and report specifically includes: according to the acquisition requirement of the AI task, the terminal follows a specified data processing mode, and a data acquirer preprocesses and cleans data. Furthermore, according to a predefined or configured format, data packets of acquired data are formed and sent to the network. The data acquisition result may be transmitted through data packets of the protocol layer or control units such as MAC CE, RLC control packets, PDCP control packets and RRC data packets.

AI function execution specifically includes an AI endogenous algorithm and calculation part which trains or predicts the model according to model and algorithm configurations of the AI task and according to a training data set of the acquired data, or gives a corresponding decision. The AI function execution further includes synchronous maintenance of model parameters during AI training. For example, in a federated learning scenario, the network needs to calculate global parameters according to parameters reported by each terminal, and then issue the global parameters to each terminal. Synchronization of the model parameters may be transmitted in form of RRC signaling or MAC CE.

The decision generation specifically includes: determining a final decision according to a result obtained from the AI function execution, such as network configuration, resource allocation result, or channel estimation at the physical layer, etc. Decision related to the terminal may be notified to a peer side through RRC signaling or MAC CE.

The data management specifically includes: using a unified database (which may be divided into three parts, i.e., AI task queue, algorithm set, and data set) used in the embodiments of the disclosure, to provide data storage services for these data through the database. The AI task queue indicates that when tasks required externally or internally are received, in a case that there is no way for the network to execute the tasks immediately at that time, the tasks may be cached in the AI task queue and processed according to priorities of the tasks. The Algorithm set: it is a total set of algorithms available in the system, a task scheduling and decomposition module determines the model and algorithm used by each task, and the AI function executor obtains the corresponding model and algorithm from the set. Furthermore, the algorithm set may also save trained models and algorithms, to facilitate direct inference or issue to the terminal to perform inference by the terminal. The data set saves data which has been processed by the terminal or the network itself according to data acquisition and processing requirements of the AI task. This part of data includes user status such as user throughput or the like, common information such as cell status or the like, and specific information required for each task, such as trajectory of a certain user, etc.

In the architecture shown in FIG. 6, a process of an example of switching optimization is as follows.

1) The access network receives switching optimization task requirement, saves the requirement in the task queue, schedules the task queue, establishes an AI task for the terminal (switching optimization), and sends RRC signaling to the terminal, RRC signaling includes configuring the AI model, and notifying UE to acquire position information and channel quality information. At the network side, the first function module executes the AI model.
2) After receiving RRC signaling, the terminal sends the task configuration to the first function module, and the first function module executes AI function according to the AI model configuration and acquisition configuration, acquires data, and notifies to the access network through RRC signaling and/or MAC data packets.
3) The access network receives RRC signaling/MAC data packets, parses the data acquisition result, saves the acquired data in the data management, and obtains the corresponding decision through AI model training and inference. Furthermore, the access network saves the trained AI module to the model library.
4) The first function module verifies whether the current decision is feasible, and when the current decision is feasible, the first function module issues the decision to RRC signaling to be configured to the terminal.
5) The terminal receives the decision and performs AI task evaluation. When evaluation performance is not met, the first function module triggers switching optimization requirement and sends the requirement to the access network through RRC signaling.
6) The above operations 1) to 5) are repeated, until the decision meets evaluation or reaches a maximum number of adjustments.

Figure 7:
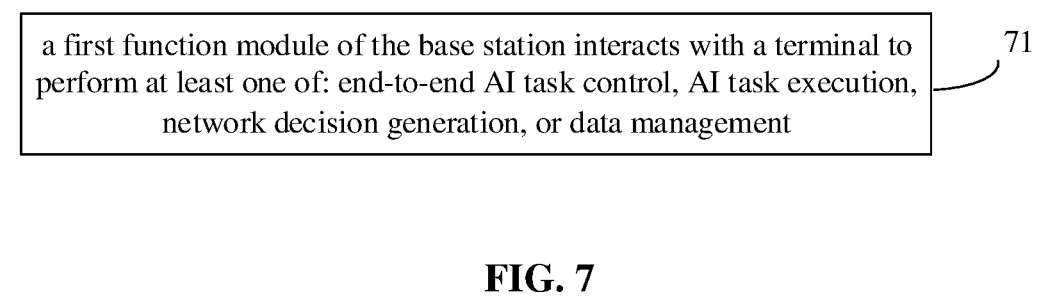

FIG. 7 shows an AI task control method provided in an embodiment of the disclosure, the method is applied to a base station, and includes the following operation 71.

At 71, a first function module of the base station performs at least one of AI task control for a terminal, AI task execution, network decision generation, or data management by interacting with the terminal.

Through the above operation, the embodiment of the disclosure implements an intelligent endogenous network and improves intelligence of the network, based on utilizing computing power of the terminal.

In an embodiment, the AI task control may include that:

the first function module determines one or more configurations of configurations inlcuding a first AI model and algorithm required to be used, data acquisition requirement, data preprocessing mode, AI task configuration, and AI model evaluation indexes according to external or internal task requirement of the base station, and configures the one or more configurations to at least the terminal or a local position, and receives at least a data acquisition result or AI model evaluation result sent by the terminal.

In an embodiment, the AI task execution may include that:

the first function module generates a corresponding execution result based on the data acquisition result according to the first AI model and algorithm.

In an embodiment, the network decision generation may include that:

the first function module generates network decision according to an execution result generated by an AI task execution unit.

In an embodiment, the data management may include that:

the first function module maintains a task queue of AI tasks, an AI model and algorithm library, and an acquired data set.

In an embodiment, the above method may further include the following operations.

The first function module forms an AI model library for executing the task requirement according to the task requirement, determines the AI model evaluation indexes, evaluates AI models in the AI model library, and determines the first AI model required to be used, the evaluation indexes include at least model convergence time or prediction accuracy.

In an embodiment, the above method may further include the following operations.

The first function module sends the data acquisition requirement to a corresponding module in the base station, receives the data acquisition result sent by the module in the base station, and sends the network decision to the corresponding module in the base station.

In an embodiment, the above method may further include the following operations.

The first function module determines other network elements required to participate in calculation of the task requirement, schedules and controls the other network elements to participate in a training task of the first AI model, and performs synchronization of the first AI model and transmission of model parameters between the base station and the other network elements.

In an embodiment, the above method may further include the following operations.

The first function module performs at least one of following operations through interacting with a RRC layer function module of the base station:

sending, by the RRC layer function module, a first task request to the terminal;

receiving a second task requirement from the terminal forwarded by the RRC layer function module;

sending, by the RRC layer function module, one or more configurations of configurations including the first AI model and algorithm, the data acquisition requirement, the data preprocessing mode, the AI task configuration, and the AI model evaluation indexes to the terminal;

sending, by the RRC layer function module, network decision for the second task requirement to the terminal; or receiving, at least one of data, labels, AI model evaluation results or AI model parameters sent by the terminal or other network element nodes and forwarded by the RRC layer function module.

In an embodiment, the above method may further include the following operations.

The first function module performs at least one of following operations through interacting with a MAC layer function module of the base station:

sending, by the MAC layer function module, a third task requirement to the terminal;

receiving a fourth task requirement from the terminal forwarded by the MAC layer function module;

sending, by the MAC layer function module, one or more configurations of configurations including the first AI model and algorithm, the data acquisition requirement, the data preprocessing mode, the AI task configuration, and the AI model evaluation indexes to the terminal;

sending, by the MAC layer function module, network decision for the second task requirement to the terminal; or receiving at least one of data, labels, AI model evaluation results or AI model parameters sent by the terminal or other network element nodes and forwarded by the MAC layer function module.

In an embodiment, the base station may further include other protocol layer modules configured to perform at least one of following operations:

issuing a fifth task requirement to the first function module; or receiving network decision for the third task requirement fed back by the first function module.

Figure 8:
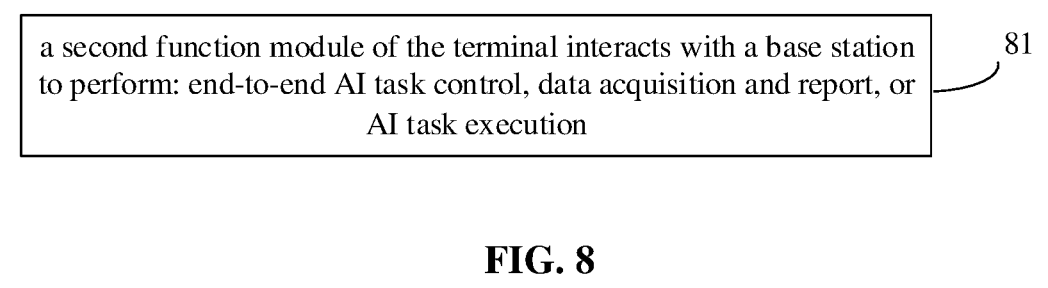

FIG. 8 shows an AI task control method provided in an embodiment of the disclosure, the method is applied to a terminal, and includes the following operation 81.

At 81, a second function module of the terminal performs at least one of following functions through interacting with a base station: AI task control to the terminal, data acquisition and report, or AI task execution.

Through the above operation, the embodiment of the disclosure may implement an intelligent endogenous network and improves intelligence of the network, by utilizing computing power of the terminal.

In an embodiment, the AI task control may include that:

the second function module receives one or more configurations, that are sent by the base station, of configurations including a first AI model and algorithm, data acquisition requirement, data preprocessing mode, AI task configuration, and AI model evaluation indexes.

In an embodiment, the AI task execution (that is, executing the AI task) may include at least one of:

the second function module executing an AI task according to the first AI model and algorithm configured by the base station, and generating an inference result; performing evaluation according to the AI model evaluation indexes configured by the base station, obtaining at least AI model evaluation results or AI model parameters and sending at least the AI model evaluation results or AI model parameters to the base station; or the second function module performing AI model synchronization between the terminal and the base station.

In an embodiment, the data acquisition and report may include that:

the second function module acquires data according to the data acquisition requirement and the data preprocessing mode, generates at least acquired data or labels, and reports at least the acquired data or labels to the base station.

In an embodiment, the method may further include the following operations.

The second function module performs at least one of following operations through interacting with a RRC layer function module of the terminal:

receiving a first task requirement from the base station forwarded by the RRC layer function module;

sending, by the RRC layer function module, a second task requirement generated by the second function module itself to the base station;

receiving one or more configurations, that are sent from the base station forwarded by the RRC layer function module, of configurations including the first AI model and algorithm, the data acquisition requirement, the data preprocessing mode, the AI task configuration, and the AI model evaluation indexes; or sending, by the RRC layer function module, at least one of the acquired data, labels, AI model evaluation results or AI model parameters to the base station.

In an embodiment, the method may further include the following operations.

The second function module performs at least one of following operations through interacting with a MAC layer function module of the terminal:

receiving a third task requirement from the base station forwarded by the MAC layer function module;

sending, by the MAC layer function module, a fourth task requirement generated by the second function module itself to the base station;

receiving one or more configurations, that are sent from the base station forwarded by the MAC layer function module, of configurations including the first AI model and algorithm, the data acquisition requirement, the data preprocessing mode, the AI task configuration, and the AI model evaluation indexes, and sending the one or more configurations to the configuration receiving unit; or sending, by the MAC layer function module, at least one of the acquired data, labels, AI model evaluation results or AI model parameters to the base station.

In an embodiment, the terminal may further include other access protocol layer modules configured to perform at least one of following operations:

issuing a sixth task requirement to the second function module; or acquiring data according to the data acquisition requirement generated by the second function module, and feeding back to the second function module.

Figure 9:
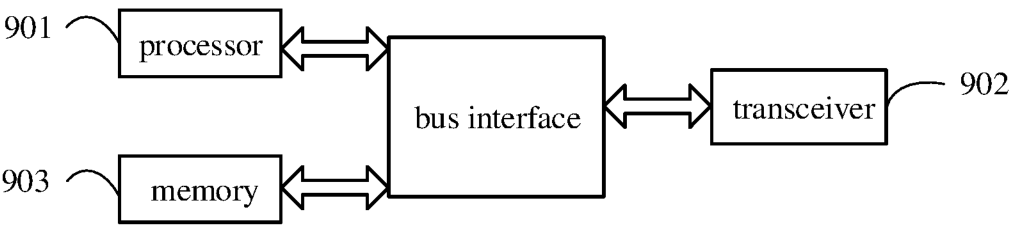
FIG. 9 is a schematic structural diagram of a base station according to an embodiment of the disclosure.

FIG. 9 shows a base station provided in an embodiment of the disclosure, the base station includes a processor 901, a transceiver 902, a memory 903, and a bus interface.

In the embodiment of the disclosure, the base station further includes a program stored on the memory 903 and executable on the processor 901, the program implements the following operations when the program is executed by the processor 901.

A first function module of the base station performs at least one of AI task control for a terminal, AI task execution, network decision generation, or data management by interacting with the terminal.

In an embodiment, at least one of the following operations is also implemented when the processor executes the program:

determining one or more configurations of configurations including a first AI model and algorithm required to be used, data acquisition requirement, data preprocessing mode, AI task configuration, and AI model evaluation indexes according to external or internal task requirement of the base station, and configuring the one or more configurations to at least the terminal or a local position, and receiving at least a data acquisition result or AI model evaluation result sent by the terminal;

generating a corresponding execution result based on the data acquisition result according to the first AI model and algorithm;

generating network decision according to the execution result generated by the AI task execution unit; or maintaining a task queue of AI tasks, an AI model and algorithm library, and an acquired data set.

In an embodiment, the following operations are also implemented when the processor executes the program.

The first function module is used to form an AI model library for executing the task requirement according to the task requirement, determine the AI model evaluation indexes, evaluate AI models in the AI model library, and determine the first AI model required to be used, the evaluation indexes include at least model convergence time or prediction accuracy.

In an embodiment, the following operations are also implemented when the processor executes the program.

The first function module sends the data acquisition requirement to a corresponding module in the base station, and receives the data acquisition result sent by the module in the base station, and sends the network decision to the corresponding module in the base station.

In an embodiment, the following operations are also implemented when the processor executes the program.

The first function module determines other network elements required to participate in calculation of the task requirement, schedules and controls the other network elements to participate in a training task of the first AI model, and performs synchronization of the first AI model and transmission of model parameters between the base station and the other network elements.

In an embodiment, the following operations are also implemented when the processor executes the program.

The first function module performs at least one of following operations through interacting with a RRC layer function module of the base station:

sending, by the RRC layer function module, a first task request to the terminal;

receiving a second task requirement from the terminal forwarded by the RRC layer function module;

sending, by the RRC layer function module, one or more configurations of configurations including the first AI model and algorithm, the data acquisition requirement, the data preprocessing mode, the AI task configuration, and the AI model evaluation indexes to the terminal;

sending, by the RRC layer function module, network decision for the second task requirement to the terminal; or receiving, at least one of data, labels, AI model evaluation results or AI model parameters sent by the terminal or other network element nodes and forwarded by the RRC layer function module.

In an embodiment, the following operations are also implemented when the processor executes the program.

The first function module performs at least one of following operations through interacting with a MAC layer function module of the base station:

sending, by the MAC layer function module, a third task requirement to the terminal;

receiving a fourth task requirement from the terminal forwarded by the MAC layer function module;

sending, by the MAC layer function module, one or more configurations of configurations including the first AI model and algorithm, the data acquisition requirement, the data preprocessing mode, the AI task configuration, and the AI model evaluation indexes to the terminal;

sending, by the MAC layer function module, network decision for the second task requirement to the terminal; or receiving at least one of data, labels, AI model evaluation results or AI model parameters sent by the terminal or other network element nodes and forwarded by the MAC layer function module.

In an embodiment, the following operations are also implemented when the processor executes the program.

Other protocol layer modules perform at least one of following operations:

issuing a fifth task requirement to the first function module; or receiving network decision for the third task requirement fed back by the first function module.

It may be understood that in the embodiments of the disclosure, when the computer program is executed by the processor 901, various processes of the above method embodiment shown in FIG. 7 may be implemented, and the same technical effect may be achieved, which are not elaborated here to avoid repetition.

In FIG. 9, a bus architecture may include any number of interconnected buses and bridges, specifically, one or more processors represented by the processor 901 and various circuits of memory represented by the memory 903 are linked together. In an actual application, the bus architecture may further link various other circuits such as peripheral devices, voltage stabilizers, power management circuits or the like together, which are not further described in the disclosure. The bus interface provides interfaces. The transceiver 902 may include multiple elements, that is, include a transmitter and a receiver, provide units communicating with various other devices over transmission media.

The processor 901 is responsible for managing the bus architecture and general processing, and the memory 903 may store data used by the processor 901 when it performs operations.

It should be noted that the terminal in the embodiment is a device corresponding to the above method shown in FIG. 7, and implementations in the above embodiments are all applicable to the embodiment of the terminal, and the same technical effect may also be achieved. In the device, the transceiver 902 and the memory 903 as well as the transceiver 902 and the processor 901 may be communicatively connected through the bus interface, functions of the processor 901 may also be implemented by the transceiver 902, and functions of the transceiver 902 may also be implemented by the processor 901. What needs to be explained here is that the above device provided in the embodiment of the disclosure may implement all method operations implemented by the above method embodiments, and may achieve the same technical effect. The parts in the embodiment which are the same as the method embodiments and advantageous effects thereof are not described in detail here.

In some embodiments of the disclosure, there is also provided a computer-readable storage medium, having stored thereon a program, the program implements the following operations when the program is executed by a processor.

A first function module of a base station performs at least one of AI task control for a terminal, AI task execution, network decision generation, or data management by interacting with the terminal.

When the program is executed by the processor, all implementations in the above AI task control method applied to the base station side may be implemented, and the same technical effect may be achieved, which are not elaborated here to avoid repetition.

Figure 10:
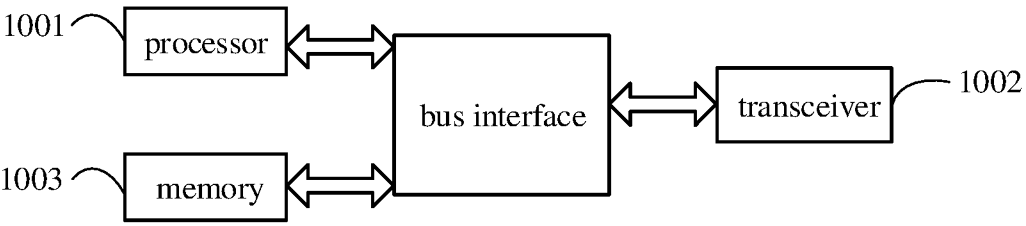
FIG. 10 is a schematic structural diagram of a terminal according to an embodiment of the disclosure.

FIG. 10 shows a structure of a terminal provided in an embodiment of the disclosure. The terminal includes a processor 1001, a transceiver 1002, a memory 1003, and a bus interface.

In the embodiment of the disclosure, the terminal further includes a program stored on the memory 1003 and executable on the processor 1001.

The following operations are implemented when the processor 1001 executes the program.

A second function module of the terminal performs at least one of following functions through interacting with a base station: AI task control to the terminal, data acquisition and report, or AI task execution.

In an embodiment, when the processor executes the program, at least one of the following operations is also implemented:

receiving one or more configurations, that are sent by the base station, of configurations including a first AI model and algorithm, data acquisition requirement, data preprocessing mode, AI task configuration, and AI model evaluation indexes;

executing an AI task according to the first AI model and algorithm configured by the base station, and generating an inference result; performing evaluation according to the AI model evaluation indexes configured by the base station, obtaining at least AI model evaluation results or AI model parameters and sending at least the AI model evaluation results or AI model parameters to the base station;

performing AI model synchronization between the terminal and the base station; or acquiring data according to the data acquisition requirement and the data preprocessing mode, generating at least acquired data or labels, and reporting at least the acquired data or labels to the base station.

In an embodiment, the following operations are also implemented when the processor executes the program.

The second function module performs at least one of following operations through interacting with a RRC layer function module of the terminal:

receiving a first task requirement from the base station forwarded by the RRC layer function module;

sending, by the RRC layer function module, a second task requirement generated by the second function module itself to the base station;

receiving one or more configuration, that are sent from the base station forwarded by the RRC layer function module, of configurations including the first AI model and algorithm, the data acquisition requirement, the data preprocessing mode, the AI task configuration, and the AI model evaluation indexes; or sending, by the RRC layer function module, at least one of the acquired data, labels, AI model evaluation results or AI model parameters to the base station.

In an embodiment, the following operations are also implemented when the processor executes the program.

The second function module performs at least one of following operations through interacting with a MAC layer function module of the terminal:

receiving a third task requirement from the base station forwarded by the MAC layer function module;

sending, by the MAC layer function module, a fourth task requirement generated by the second function module itself to the base station;

receiving one or more configurations, that are sent from the base station forwarded by the MAC layer function module, of configurations including the first AI model and algorithm, the data acquisition requirement, the data preprocessing mode, the AI task configuration, and the AI model evaluation indexes, and sending the one or more configurations to the configuration receiving unit; or sending, by the MAC layer function module, at least one of the acquired data, labels, AI model evaluation results or AI model parameters to the base station.

In an embodiment, the following operations are also implemented when the processor executes the program.

Other access protocol layer modules perform at least one of following operations:

issuing a sixth task requirement to the second function module; or acquiring data according to the data acquisition requirement generated by the second function module, and feeding back to the second function module.

It may be understood that in the embodiments of the disclosure, when the computer program is executed by the processor 1001, various processes of the above method embodiment shown in FIG. 8 may be implemented, and the same technical effect may be achieved, which are not elaborated here to avoid repetition.

In FIG. 10, a bus architecture may include any number of interconnected buses and bridges, specifically, one or more processors represented by the processor 1001 and various circuits of memory represented by the memory 1003 are linked together. In an actual application, the bus architecture may further link various other circuits such as peripheral devices, voltage stabilizers, power management circuits or the like together, which are not further described in the disclosure. The bus interface provides interfaces. The transceiver 1002 may include multiple elements, that is, include a transmitter and a receiver, provide units communicating with various other devices over transmission media.

In an actual application, the terminal may further include user interfaces. In case of different user devices, the user interfaces may further include interfaces which may be connected to required devices externally or internally. The connected devices include, but are not limited to a keypad, display, speaker, microphone, joystick, etc.

The processor 1001 is responsible for managing the bus architecture and general processing, and the memory 1003 may store data used by the processor 1001 when it performs operations.

It should be noted that the device in the embodiment is a device corresponding to the above method shown in FIG. 8, and implementations in the above embodiments are all applicable to the embodiment of the device, and the same technical effect may also be achieved. In the device, the transceiver 1002 and the memory 1003 as well as the transceiver 1002 and the processor 1001 may be communicatively connected through the bus interface, functions of the processor 1001 may also be implemented by the transceiver 1002, and functions of the transceiver 1002 may also be implemented by the processor 1001. What needs to be explained here is that the above device provided in the embodiment of the disclosure may implement all method operations implemented by the above method embodiments, and may achieve the same technical effect. The parts in the embodiment which are the same as the method embodiments and advantageous effects thereof are not described in detail here.

In some embodiments of the disclosure, there is also provided a computer-readable storage medium, having stored thereon a program, the program implements the following operations when the program is executed by a processor.

A second function module of the terminal performs at least one of following functions through interacting with a base station: AI task control to the terminal, data acquisition and report, or AI task execution.

When the program is executed by the processor, all implementations in the above AI task control method applied to the terminal side may be implemented, and the same technical effect may be achieved, which are not elaborated here to avoid repetition.

It may be appreciated by those of ordinary skill in the art that units and algorithm operations of the examples described in combination with the embodiments disclosed in the disclosure may be implemented by electronic hardware or a combination of computer software and electronic hardware. Whether these functions are executed in form of hardware or software, depends on specific application and design constraints of the technical solution. Professional technicians may use different methods for each specific application to implement the described functions, however, such implementation should not be considered as going beyond the scope of the disclosure.

It may be clearly understood by those skilled in the art that for the convenience and brevity of descriptions, specific operation processes of the above system, device and unit may refer to corresponding processes in the foregoing method embodiments, which are not elaborated here.

In the embodiments provided in the disclosure, it should be understood that the disclosed devices and methods may be implemented in other ways. For example, the above device embodiments are only illustrative. For example, division of the units is only a logical function division. In an actual implementation, there may be other division modes. For example, multiple units or components may be combined or may be integrated into another system, or some features may be ignored, or may not be implemented. Furthermore, mutual coupling or direct coupling or communicative connection as shown or discussed may be indirect coupling or communicative connection through some interfaces, devices or units, may be in electrical, mechanical or other forms.

The units described as separate components may be or may not be physically separated, and the components shown as units may be or may not be physical units, that is, they may be located in a place, or may be distributed to multiple network units. Part or all of the units may be selected according to actual requirements to achieve the purpose of solutions of the embodiments of the disclosure.

Furthermore, each function unit in each embodiment of the disclosure may be integrated into a processing unit, or each unit may separately exist physically, or two or more units may be integrated into a unit.

When the functions are implemented in form of software function units and sold or used as an independent product, the functions may be stored in a computer-readable storage medium. Based on such understanding, the technical solutions of the disclosure substantially or parts making contributions to the related art or part of the technical solutions may be embodied in form of software product, and the computer software product is stored in a storage medium, includes several instructions to enable a computer device (which may be a personal computer, a server, a network device, etc.) to execute all or part of operations of the method described in each embodiment of the disclosure. The foregoing storage medium includes various media capable of storing program codes such as a U disk, a mobile hard disk, a Read Only Memory (ROM), a Random Access Memory (RAM), a magnetic disk, or an optical disk, etc.

The above descriptions are only specific implementations of the disclosure, however, the scope of protection of the disclosure is not limited thereto. Any variation or replacement easily conceived by those skilled in the art within the technical scope disclosed in the disclosure, should be covered in the scope of protection of the disclosure. Therefore, the scope of protection of the disclosure should be subjected to the scope of protection of the claims.

The invention claimed is:

1. A base station, comprising:

a memory for storing instructions;

a first processor configured to execute the instructions to:

perform at least one of Artificial Intelligence (AI) task control for a terminal, AI task execution, network decision generation, or data management by interacting with the terminal, wherein the first processor is further configured to execute the instructions to:

determine one or more configurations of configurations comprising a first AI model and algorithm required to be used, data acquisition requirement, data preprocessing mode, AI task configuration, and AI model evaluation indexes, and configure the one or more configurations to at least one the terminal or a local position, and receive at least a data acquisition result or AI model evaluation result sent by the terminal;

generate a corresponding execution result based on the data acquisition result according to the first AI model and algorithm;

generate network decision according to the execution result; or maintain at least one of a task queue of AI tasks, an AI model and algorithm library, or an acquired data set.

2. The base station of claim 1, wherein the first processor is further configured to execute the instructions to form an AI model library determine the AI model evaluation indexes, evaluate AI models in the AI model library, and determine the first AI model required to be used, the evaluation indexes comprise at least model convergence time or prediction accuracy.

3. The base station of claim 1, wherein the base station further comprises a transceiver configured to send the data acquisition requirement to other processors in the base station, and receive the data acquisition result sent by the other processors in the base station, the transceiver is further configured to send the network decision to the other processors in the base station.

4. The base station of claim 1, wherein the first processor is further configured to execute the instructions to determine other network elements required to participate in calculation of the task requirement, schedule and control the other network elements to participate in a training task of the first AI model, and perform synchronization of the first AI model and transmission of model parameters between the base station and the other network elements.

5. The base station of claim 1, further comprising:

a second processor configured to perform at least one of:

sending a first task request to the terminal;

receiving a second task requirement from the terminal and sending the second task requirement to the first processor;

receiving the one or more configurations, that are determined by the first processor, of configurations comprising the first AI model and algorithm, the data acquisition requirement, the data preprocessing mode, the AI task configuration, and the AI model evaluation indexes, and sending the one or more configurations to the terminal;

receiving at least one of data, labels, AI model evaluation results or AI model parameters sent by the terminal or other network element nodes, and sending the at least one of data, labels, AI model evaluation results or AI model parameters to the first processor; or receiving network decision for a second task requirement fed back by the first processor and sending the network decision for the second task requirement to the terminal.

6. The base station of claim 1, further comprising:

a third processor configured to perform at least one of:

sending a third task requirement to the terminal;

receiving a fourth task requirement from the terminal and sending the fourth task requirement to the first processor;

receiving the one or more configurations, that are determined by the first processor, of configurations comprising the first AI model and algorithm, the data acquisition requirement, the data preprocessing mode, the AI task configuration, and the AI model evaluation indexes; and sending the one or more configurations to the terminal:

receiving at least one of data, labels, AI model evaluation results or AI model parameters sent by the terminal or other network element nodes and sending the at least one of data, labels, AI model evaluation results or AI model parameters to the first processor; or receiving network decision for the second task requirement fed back by the first processor and sending the network decision for the second task requirement to the terminal.

7. The base station of claim 1, further comprising:

a fourth processor, configured to perform at least one of:

issuing a fifth task requirement to the first processor; or receiving network decision for the fifth task requirement fed back by the first processor.

8. A terminal, comprising:

a memory for storing instructions;

a first processor configured to execute the instructions to:

perform at least one of Artificial Intelligence (AI) task control for the terminal, data acquisition and report, or AI task execution by interacting with a base station, wherein the terminal further comprises a transceiver:

the transceiver is configured to receive one or more configurations of configurations comprising a first AI model and algorithm, data acquisition requirement, data preprocessing mode, AI task configuration, and AI model evaluation indexes sent by the base station;

the first processor is further configured to execute the instructions to execute an AI task according to the first AI model and algorithm configured by the base station, and generate an inference result; perform evaluation according to the AI model evaluation indexes configured by the base station, and obtain at least AI model evaluation results or AI model parameters; and the transceiver is further configured to send at least the AI model evaluation results or AI model parameters to the base station;

the first processor is further configured to execute the instructions to: perform AI model synchronization between the terminal and the base station; or acquire data according to the data acquisition requirement and the data preprocessing mode, generate at least acquired data or labels; and the transceiver is further configured to report at least the acquired data or labels to the base station.

9. The terminal of claim 8, further comprising:

a second processor configured to perform at least one of:

receiving a first task requirement from the base station and issuing the first task requirement to the first processor;

sending a second task requirement generated by the first processor itself to the base station through the RRC layer;

receiving one or more configurations, that are sent by the base station, of configurations comprising the first AI model and algorithm, the data acquisition requirement, the data preprocessing mode, the AI task configuration, and the AI model evaluation indexes; or sending at least one of the acquired data, labels, AI model evaluation results or AI model parameters to the base station.

10. The terminal of claim 8, further comprising:

a third processor configured to perform at least one of:

receiving a third task requirement from the base station and issuing the third task requirement to the first processor;

sending a fourth task requirement generated by the first processor itself to the base station through the MAC layer;

receiving one or more configurations, that are sent by the base station, of configurations comprising the first AI model and algorithm, the data acquisition requirement, the data preprocessing mode, the AI task configuration, and the AI model evaluation indexes; or sending at least one of the acquired data, labels, AI model evaluation results or AI model parameters to the base station.

11. The terminal of claim 8, further comprising:

a fourth processor, configured to perform at least one of:

issuing a sixth task requirement to the first processor; or acquiring data according to the data acquisition requirement generated by the first processor, and feeding back to the first processor.

12. An Artificial Intelligence (AI) task control method, applied to a terminal, comprising:

performing, by a first processor of the terminal, at least one of AI task control for the terminal, data acquisition and report, or AI task execution by interacting with a base station, wherein the AI task control comprises:

receiving, by the first processor, one or more configurations of configurations comprising: a first AI model and algorithm, data acquisition requirement, data preprocessing mode, AI task configuration, and AI model evaluation indexes that are sent by the base station, the AI task execution comprises at least one of:

executing, by the first processor, an AI task according to the first AI model and algorithm configured by the base station, and generating an inference result;

performing evaluation according to the AI model evaluation indexes configured by the base station, obtaining at least AI model evaluation results or AI model parameters and sending at least the AI model evaluation results or AI model parameters to the base station; or performing, by the first processor, AI model synchronization between the terminal and the base station, wherein the data acquisition and report comprises:

acquiring, by the first processor, data according to the data acquisition requirement and the data preprocessing mode, generates at least acquired data or labels, and reports at least the acquired data or labels to the base station.

13. The method of claim 12, further comprising:

performing, by the first processor through interacting with a second processor of the terminal, at least one of:

receiving a first task requirement from the base station forwarded by the second processor;

sending, by the second processor, a second task requirement generated by the first processor itself to the base station;

receiving one or more configurations, that are sent from the base station and forwarded by the second processor, of configurations comprising the first AI model and algorithm, the data acquisition requirement, the data preprocessing mode, the AI task configuration, and the AI model evaluation indexes; or sending, by the second processor, at least one of the acquired data, labels, AI model evaluation results or AI model parameters to the base station.

14. The method of claim 12, further comprising:

performing, by the first processor through interacting with a third processor of the terminal, at least one of:

receiving a third task requirement which is sent from the base station forwarded by the third processor;

sending, by the third processor, a fourth task requirement generated by the first processor itself to the base station;

receiving one or more configurations, that are sent from the base station and forwarded by the third processor, of configurations comprising the first AI model and algorithm, the data acquisition requirement, the data preprocessing mode, the AI task configuration, and the AI model evaluation indexes, and sending the one or more configurations to a transceiver of the terminal; or sending, by the third processor, at least one of the acquired data, labels, AI model evaluation results or AI model parameters to the base station.

* * * * *